United States Patent
De Paula et al.

(10) Patent No.: US 11,365,791 B1
(45) Date of Patent: Jun. 21, 2022

(54) BALL NUT DRIVE ASSEMBLY

(71) Applicant: Schaeffler Technologies AG & Co. KG, Herzogenaurach (DE)

(72) Inventors: Renato De Paula, Sterling Heights, MI (US); Michael Zinnecker, Berkley, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/112,106

(22) Filed: Dec. 4, 2020

(51) Int. Cl.
*F16H 25/22* (2006.01)
*F16H 25/20* (2006.01)

(52) U.S. Cl.
CPC ..... *F16H 25/2015* (2013.01); *F16H 25/2214* (2013.01); *F16H 25/2233* (2013.01)

(58) Field of Classification Search
CPC .. B60T 17/085; B60T 17/086; F16H 25/2427; F16H 25/2209; F16H 25/2238; F16H 2025/2463; F16H 25/2454; F16H 25/2015; F16H 25/2214; F16H 25/2233
See application file for complete search history.

(56) References Cited

U.S. PATENT DOCUMENTS

| | | | |
|---|---|---|---|
| 8,616,348 B2 | 12/2013 | Winkler et al. | |
| 8,875,851 B2 | 11/2014 | Winkler | |
| 2009/0283371 A1* | 11/2009 | Winkler | F16D 65/18 188/72.6 |
| 2011/0120247 A1* | 5/2011 | Osterlaenger | F16H 25/2233 74/424.82 |
| 2011/0162935 A1* | 7/2011 | Winkler | F16H 25/2238 192/219.4 |
| 2012/0018262 A1* | 1/2012 | Winkler | F16D 65/18 188/106 F |
| 2015/0330487 A1* | 11/2015 | Wilhelm | F16H 25/2233 188/72.8 |
| 2015/0362051 A1* | 12/2015 | Adler | F16H 25/2233 74/424.81 |
| 2016/0033018 A1* | 2/2016 | Tashiro | F16D 65/18 74/424.81 |
| 2016/0033019 A1* | 2/2016 | Aramoto | F16D 65/18 74/424.81 |
| 2016/0186825 A1* | 6/2016 | Winkler | B60T 13/741 188/106 F |
| 2018/0283511 A1* | 10/2018 | Tashiro | F16H 25/2015 |

(Continued)

FOREIGN PATENT DOCUMENTS

| | | |
|---|---|---|
| DE | 7640810 U1 | 7/1977 |
| GB | 1302826 A | 1/1973 |

*Primary Examiner* — Jake Cook
*Assistant Examiner* — Gregory Robert Weber
(74) *Attorney, Agent, or Firm* — Volpe Koenig

(57) ABSTRACT

A ball screw assembly is disclosed herein. The assembly includes a nut having an outer raceway, and at least one notch. A spindle extends inside of the nut, and the spindle defines an inner raceway. A ball-spring assembly includes a plurality of balls supported between the outer raceway and the inner raceway, and at least one reset spring engaged against at least one ball of the plurality of balls. At least one end-stop component is engaged against a terminal end of the ball-spring assembly and positioned within the at least one notch. A radially inner side of the at least one end-stop component abuts the spindle. A method of forming the nut for a ball screw assembly is also disclosed herein.

15 Claims, 12 Drawing Sheets

(56) References Cited

U.S. PATENT DOCUMENTS

| | | | |
|---|---|---|---|
| 2019/0323586 A1* | 10/2019 | Peric | F16H 25/2209 |
| 2020/0141475 A1* | 5/2020 | Aramoto | F16H 25/2238 |
| 2021/0062899 A1* | 3/2021 | Brubaker | F16H 25/24 |
| 2021/0140520 A1 | 5/2021 | Rodrigues de Paula et al. | |

* cited by examiner

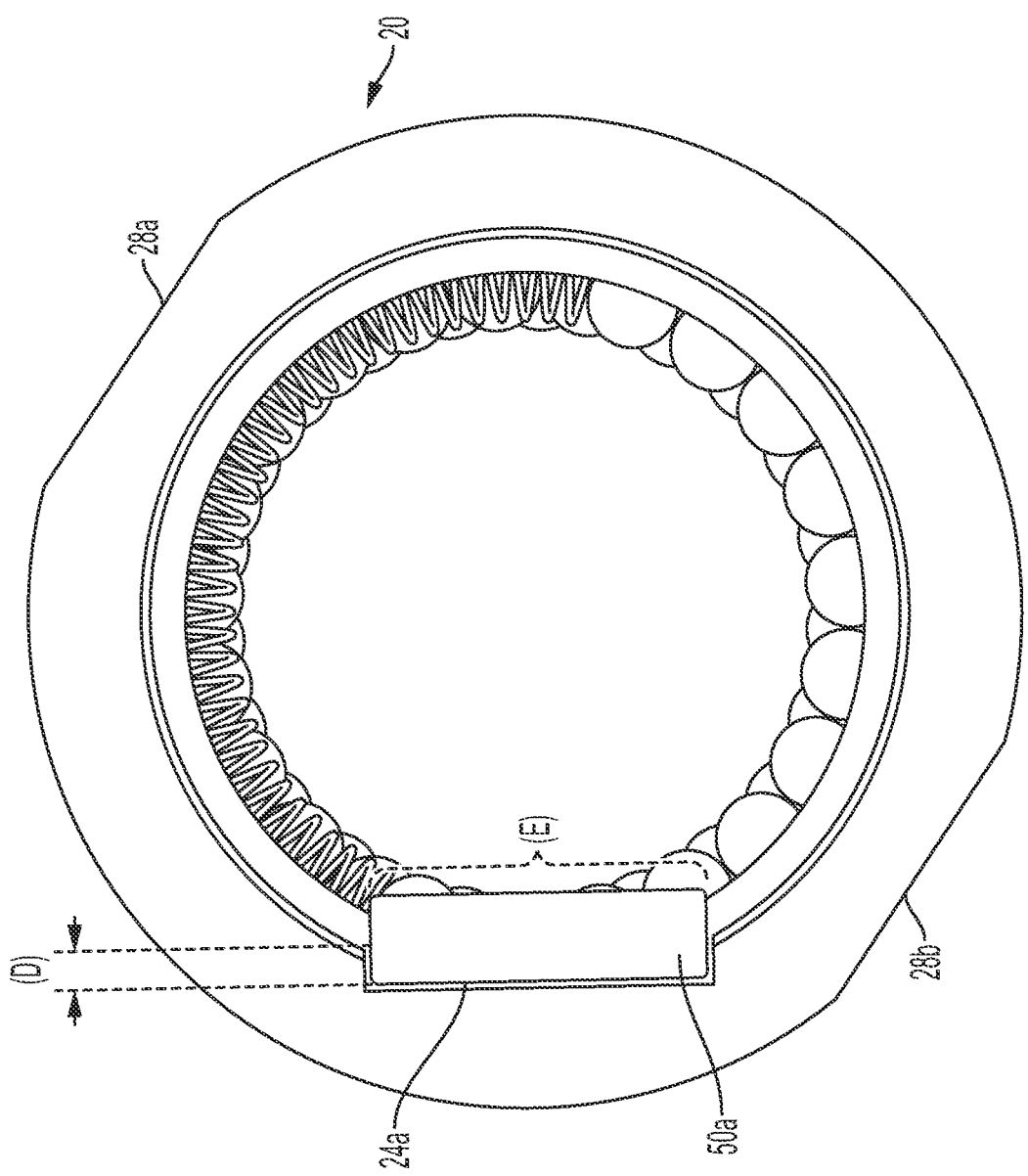

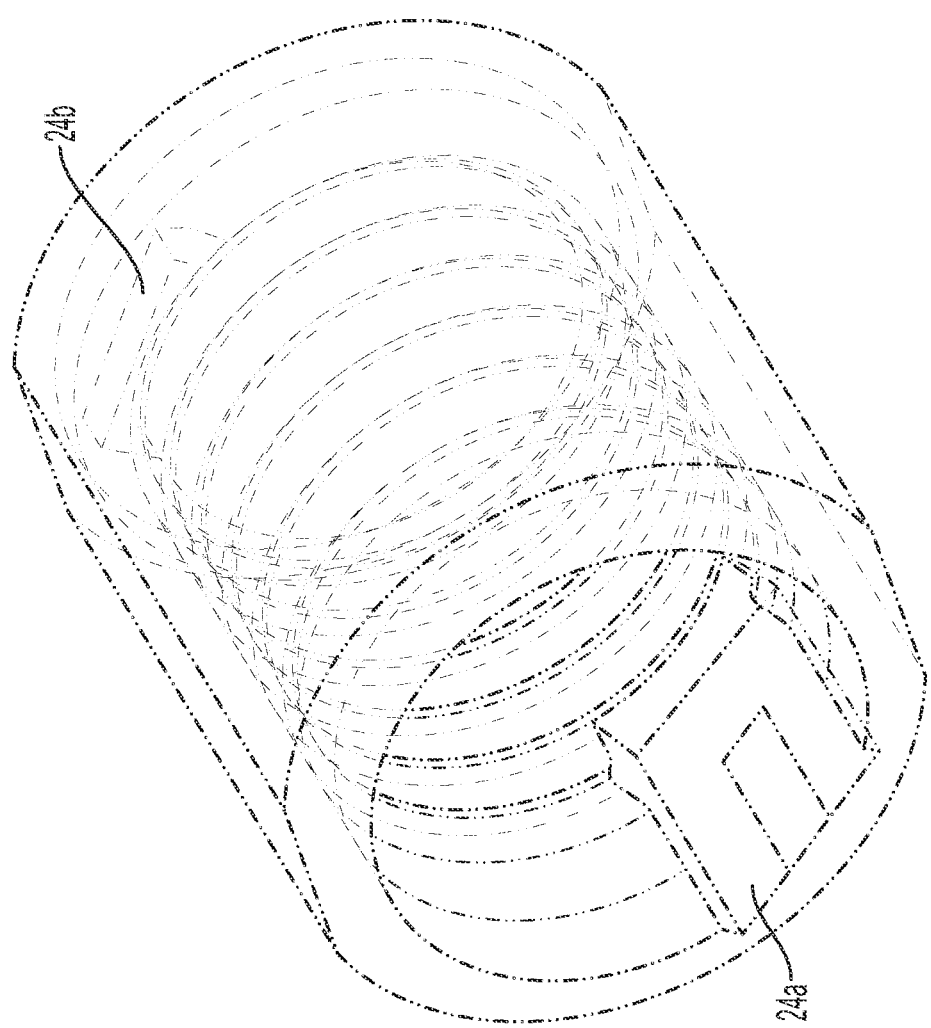

BALL NUT DRIVE ASSEMBLY

FIELD OF INVENTION

The present disclosure relates to a ball screw assembly.

BACKGROUND

Ball nut drives are well known. One type of ball nut drive lacks a ball return assembly, and instead relies on return springs to bias balls in a ball chain back to their original position. In these arrangements, an end-stop component is used, such as disclosed in U.S. Pat. No. 8,616,348. In other arrangements, an end-stop component is integrated into the ball nut, such as disclosed in U.S. Pat. No. 8,875,851.

It would be desirable to provide a ball nut drive assembly that includes a cost-effective and reliable spring end-stop interface and assembly.

SUMMARY

A ball screw assembly is disclosed herein. The assembly includes a nut having an outer raceway, and at least one notch. A spindle extends inside of the nut, and the spindle defines an inner raceway. A ball-spring assembly includes a plurality of balls supported between the outer raceway and the inner raceway, and at least one reset spring engaged against at least one ball of the plurality of balls. At least one end-stop component is engaged against a terminal end of the ball-spring assembly and positioned within the at least one notch. A radially inner side of the at least one end-stop component abuts the spindle.

In one embodiment, the notch has a quadrilateral profile. The notch can be formed by a cold-forming process. In one embodiment, the notch has flat circumferential sides each extending parallel to each other and having an identical depth (D).

The at least one notch can include two notches positioned on opposite axial ends of the nut. The notches can be circumferentially aligned with each other.

In one embodiment, the notch has a width (W) that is greater than an axial extent (E) of the at least one end-stop component.

In one embodiment, the end-stop component is a pin. In another embodiment, the end-stop component is a spring that is more tightly wound than the reset springs.

The end-stop component has a greater stiffness than a stiffness of the reset springs.

A method of forming the nut for a ball screw assembly is also disclosed herein.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 1G is an axial end view of the ball screw assembly of FIGS. 1A-1F.

FIG. 6 illustrates another embodiment of a nut for the ball screw assembly.

DETAILED DESCRIPTION OF THE PREFERRED EMBODIMENTS

Figure 1A:
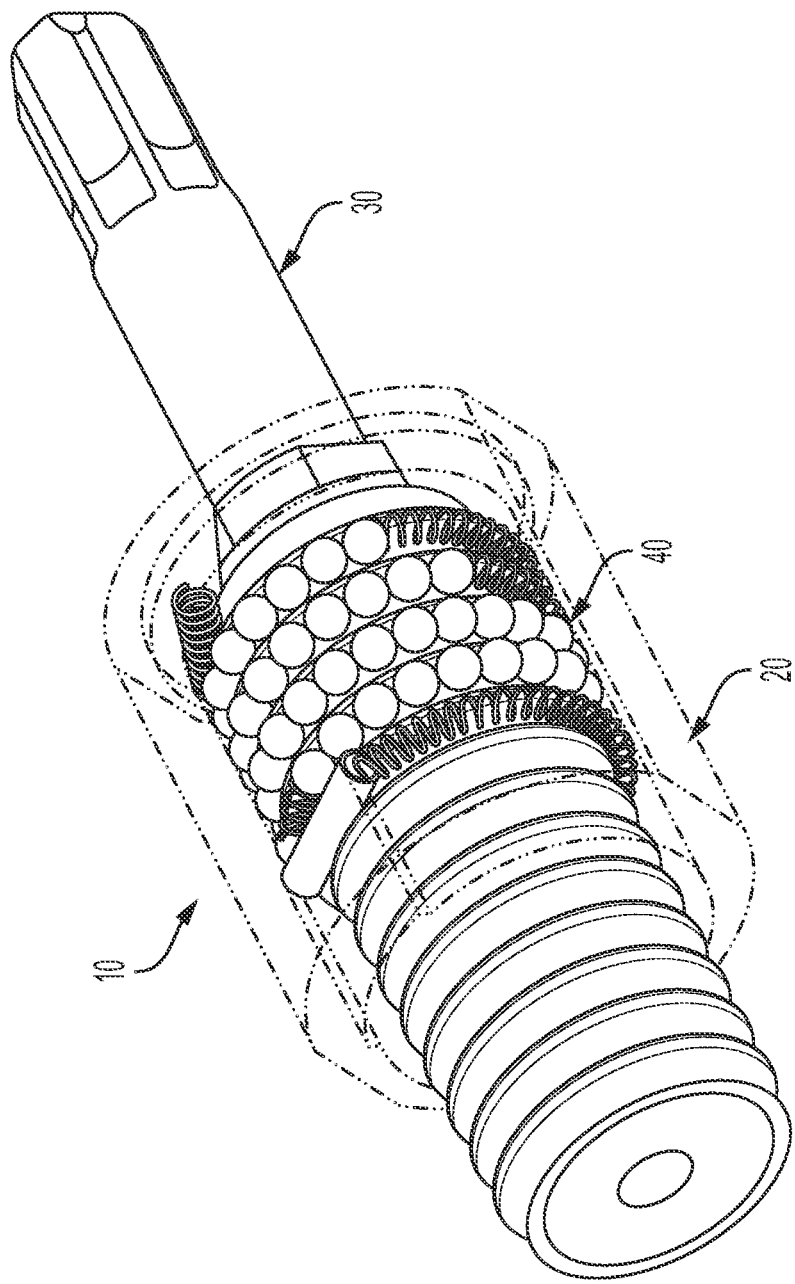
FIG. 1A is a perspective view of a ball screw assembly according to one embodiment.
Figure 1B:
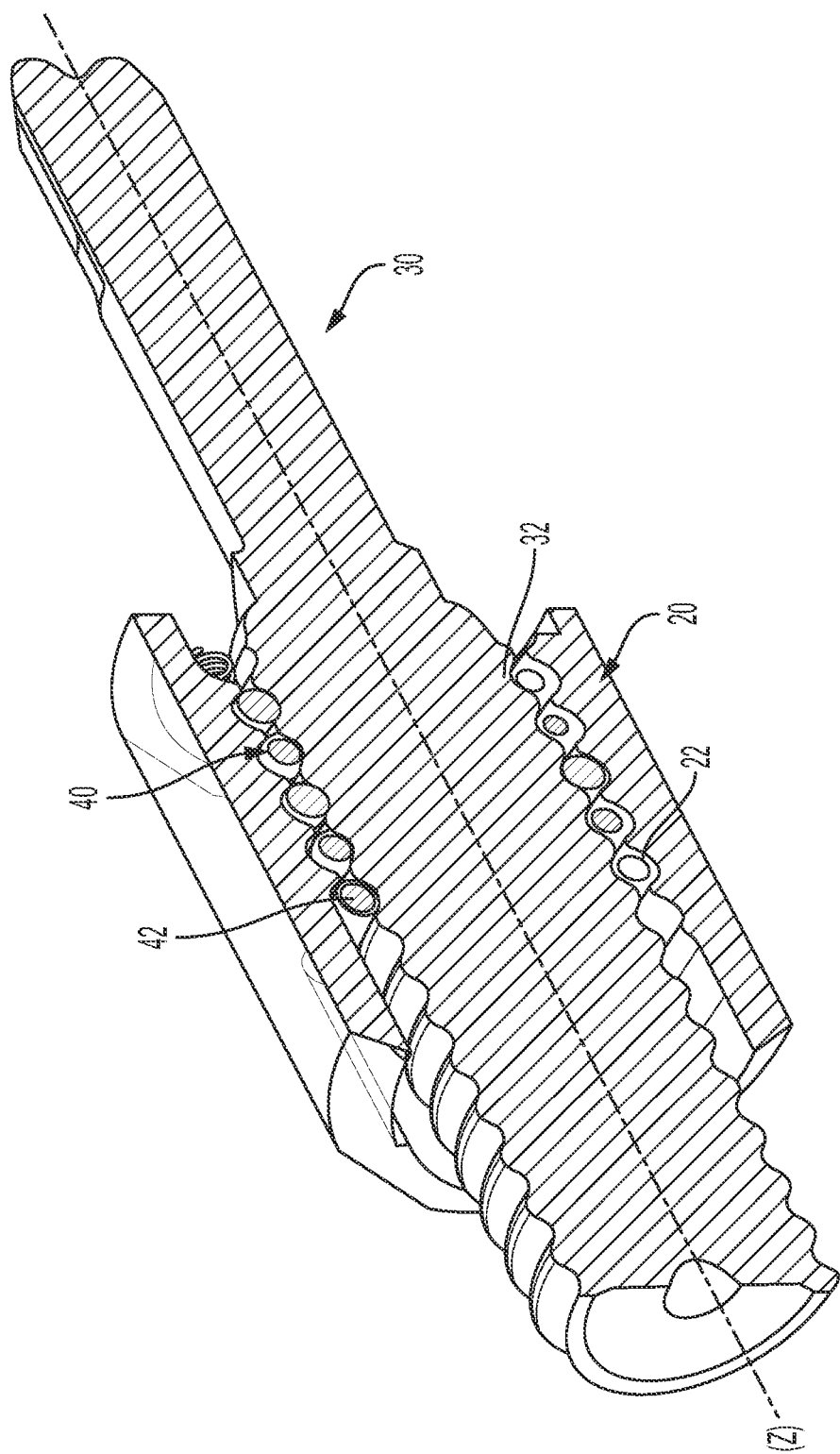
FIG. 1B is a perspective cross-sectional view of the ball screw assembly of FIG. 1A through an axial plane.

Certain terminology is used in the following description for convenience only and is not limiting. "Axially" refers to a direction along an axis (Z) of an assembly. "Radially" refers to a direction inward and outward from the axis (Z) of the assembly. "Circumferentially" refers to a direction extending along a curve or circumference of a respective element relative to the axis (Z) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A ball screw assembly 10 is illustrated in FIGS. 1A-1G. The ball screw assembly 10 includes a nut 20 defining an outer raceway 22, and at least one notch 24. The nut 20 includes an anti-rotation feature 28 on a radially outer surface in one embodiment. The anti-rotation feature 28 can be provided in the form of a flattened surface on the nut 20. The nut 20 is illustrated in dashed lines in FIGS. 1A, 1C, 1D, 1E, and 6 only for illustrative purposes so that it is possible to illustrate internal features or elements relative to the nut 20.

In one embodiment, the anti-rotation features 28 includes two diametrically opposed flattened surfaces 28a, 28b. As shown in FIG. 1G, the flattened surfaces 28a, 28b are circumferentially offset from the notch 24. The locations of the flattened surfaces 28a, 28b and the notch 24 can be modified depending on the specific requirements of a particular ball screw assembly 10.

The term notch is used herein to refer to a recess or indentation. The notch 24 is open on at least one side, and does not define a fully enclosed structure. In one embodiment, the notch 24 has a quadrilateral profile. The notch 24 can includes flat circumferential sides 25a, 25b each extending parallel to each other and having an identical depth (D). In other embodiments, the depths (D) can be adjusted depending on the particular requirements for a specific arrangement.

In one embodiment, the notch 24 is formed by a cold-forming process. One of ordinary skill in the art would understand that other formation processes can be used to form the notch 24. The nut 20 has a continuous outer wall between its axial ends 26a, 26b and does not include any holes or bores.

As shown in the drawings, the notch 24 can include a first notch 24a on a first axial end 26a of the nut 20, and a second notch 24b on a second axial end 26b of the nut 20. In one embodiment, the first notch 24a and the second notch 24b are circumferentially aligned with each other. One of ordinary skill in the art would understand that a nut 20 having a single notch 24 can be provided. Additionally, the notches 24a, 24b can also be offset in a circumferential direction from each other as shown in FIG. 6.

A spindle 30 extends inside of the nut 20, and the spindle 30 defines an inner raceway 32. The spindle 30 is configured to rotate about axis (Z).

A ball-spring assembly 40 is provided that includes a plurality of balls 42 supported between the outer raceway 22 and the inner raceway 32, and at least one reset spring 44 engaged against at least one ball of the plurality of balls 42. As shown in the drawings, the ball-spring assembly 40 includes multiple balls 42 arranged between two reset springs 44. The exact configuration of the ball-spring assembly 40 can be modified depending on the specific requirements of a particular arrangement. For example, the configuration of the reset springs 44, such as their length and spring constant, can be selected to provide a predetermined maximum loaded stroke. Additionally, the ball-spring assembly 40 can consist of the following compositions: loaded balls and springs; loaded balls and spacer balls; only loaded balls, etc.

An end-stop component 50 is engaged against a terminal end 46 of the ball-spring assembly 40 and positioned within the notch 24. More specifically, the end-stop component 50 can be engaged against an end of the rest springs. The end-stop component 50 has a greater stiffness than a stiffness of the reset springs 44. The end-stop component 50 is positioned such that a longitudinal axis of the end-stop component 50 does not intersect the axis (Z).

Figure 1C:
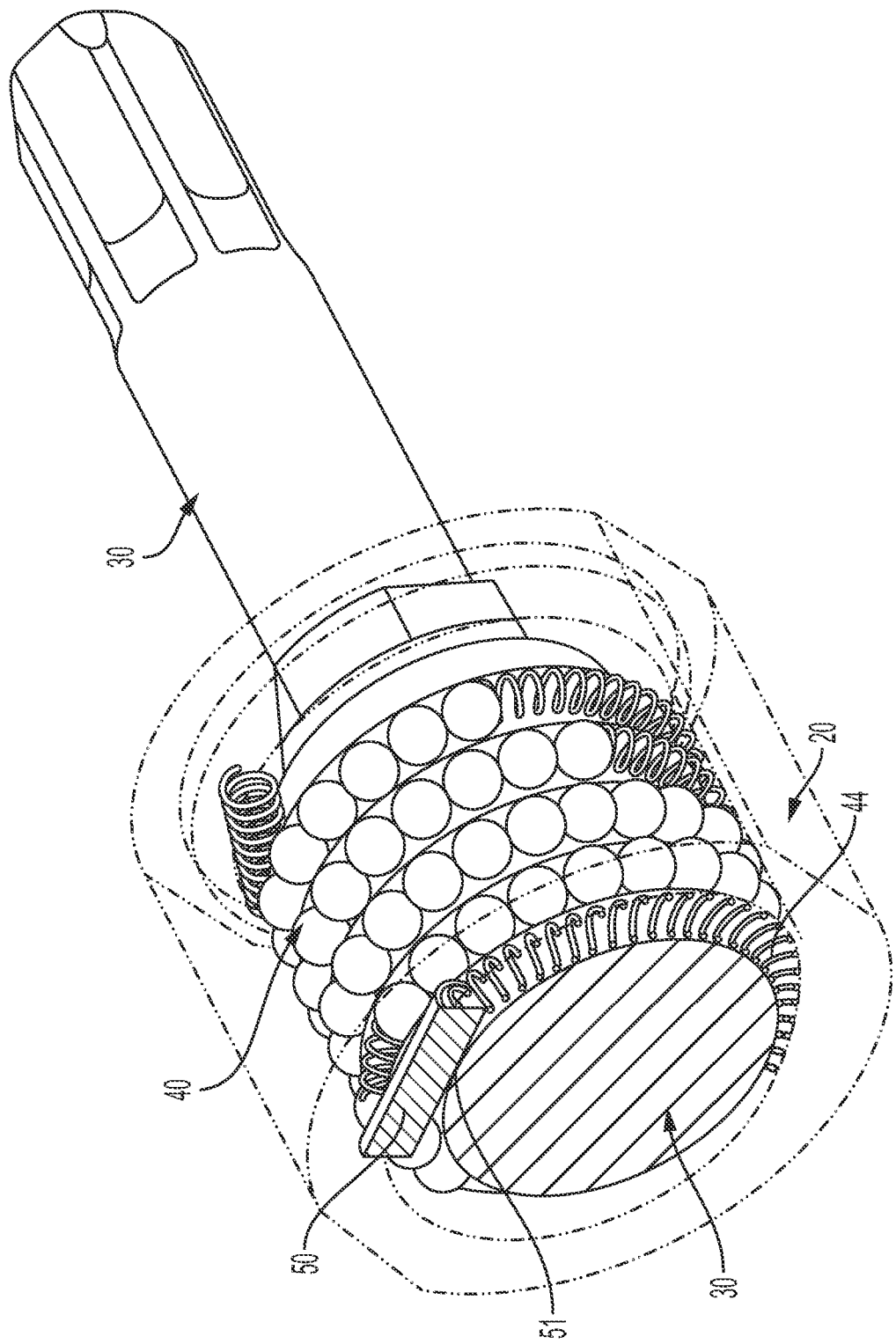
FIG. 1C is a perspective cross-sectional view of the ball screw assembly of FIGS. 1A and 1B through a radial plane.
Figure 1D:
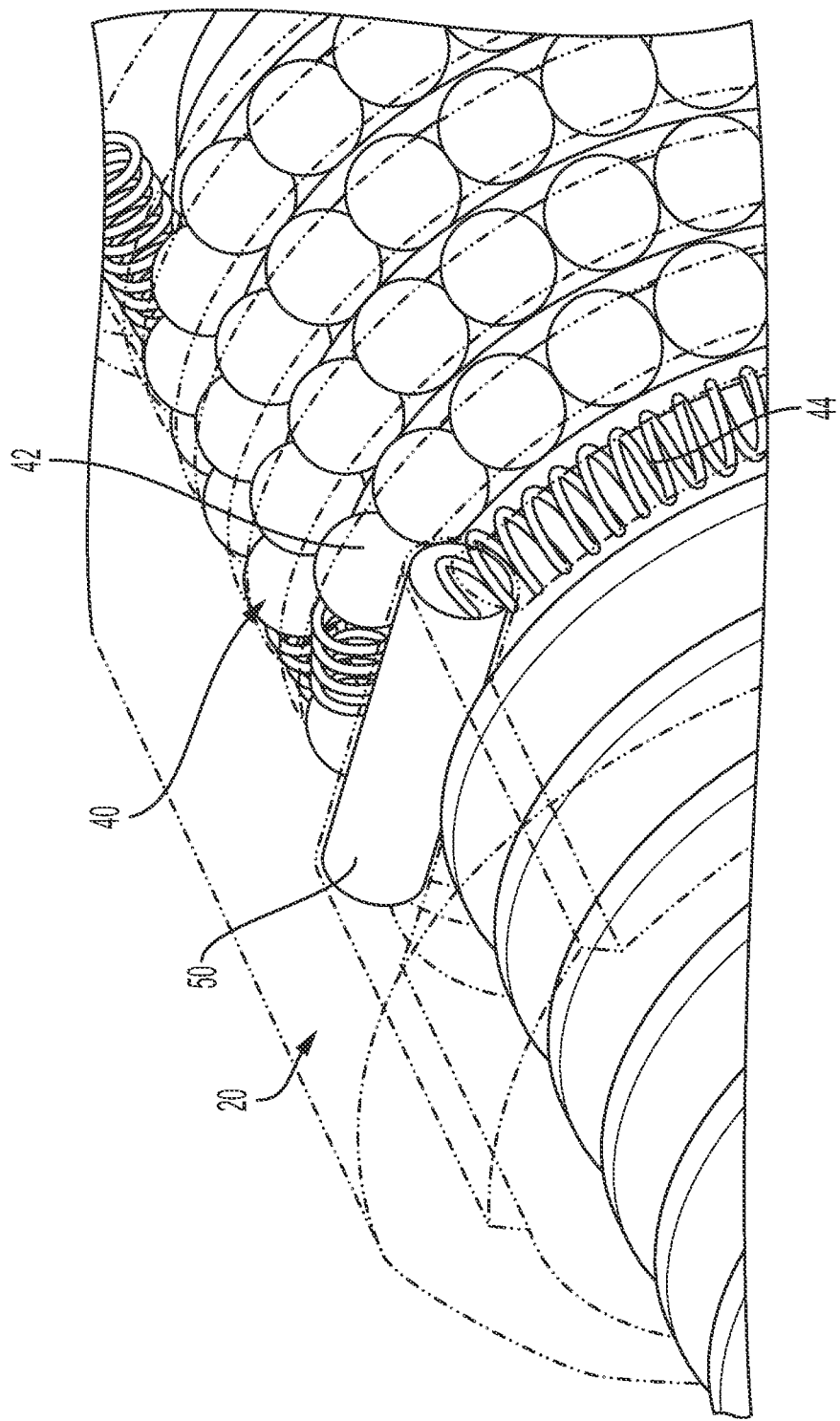
FIG. 1D is a magnified view of a portion of the ball screw assembly of FIGS. 1A-1C.
Figure 1E:
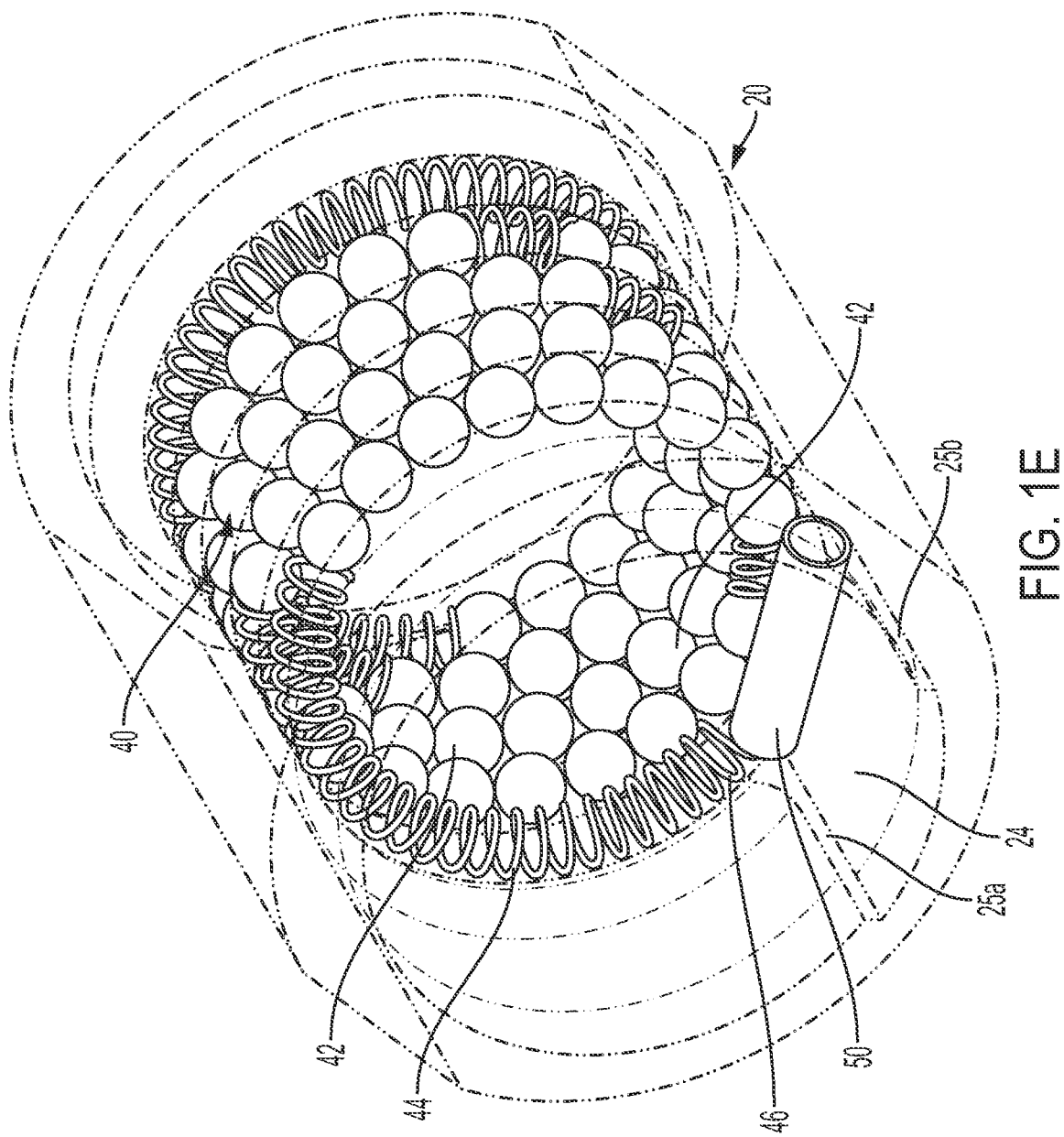
FIG. 1E is another perspective view of the ball screw assembly of FIGS. 1A-1D.

In one embodiment, shown in FIGS. 1A-1G, the end-stop component 50 is a pin or cylindrical post. In another embodiment, shown in FIG. 2, the end-stop component 150 is a tightly wound spring. In this embodiment, the end-stop component/tightly wound spring 150 is more tightly wound than the reset springs 44. In other words, the end-stop component/tightly wound spring 150 is not the same spring as the reset springs 44, and instead is stiffer than the reset springs 44. The end-stop component/tightly wound spring 150 can include coils that are in contact with each other in a non-compressed state.

In one embodiment, the notch 24 has a width (W) that is greater than an axial extent (E) of the end-stop component 50. As shown in the drawings, the width (W) of the notch 24 is defined in a circumferential direction relative to the axis (Z). In other embodiment, the width (W) of the notch 24 can be smaller than the axial extent (E) of the end-stop component 50, and the end-stop component 50 can extend into the raceways 22, 32.

Figure 1F:
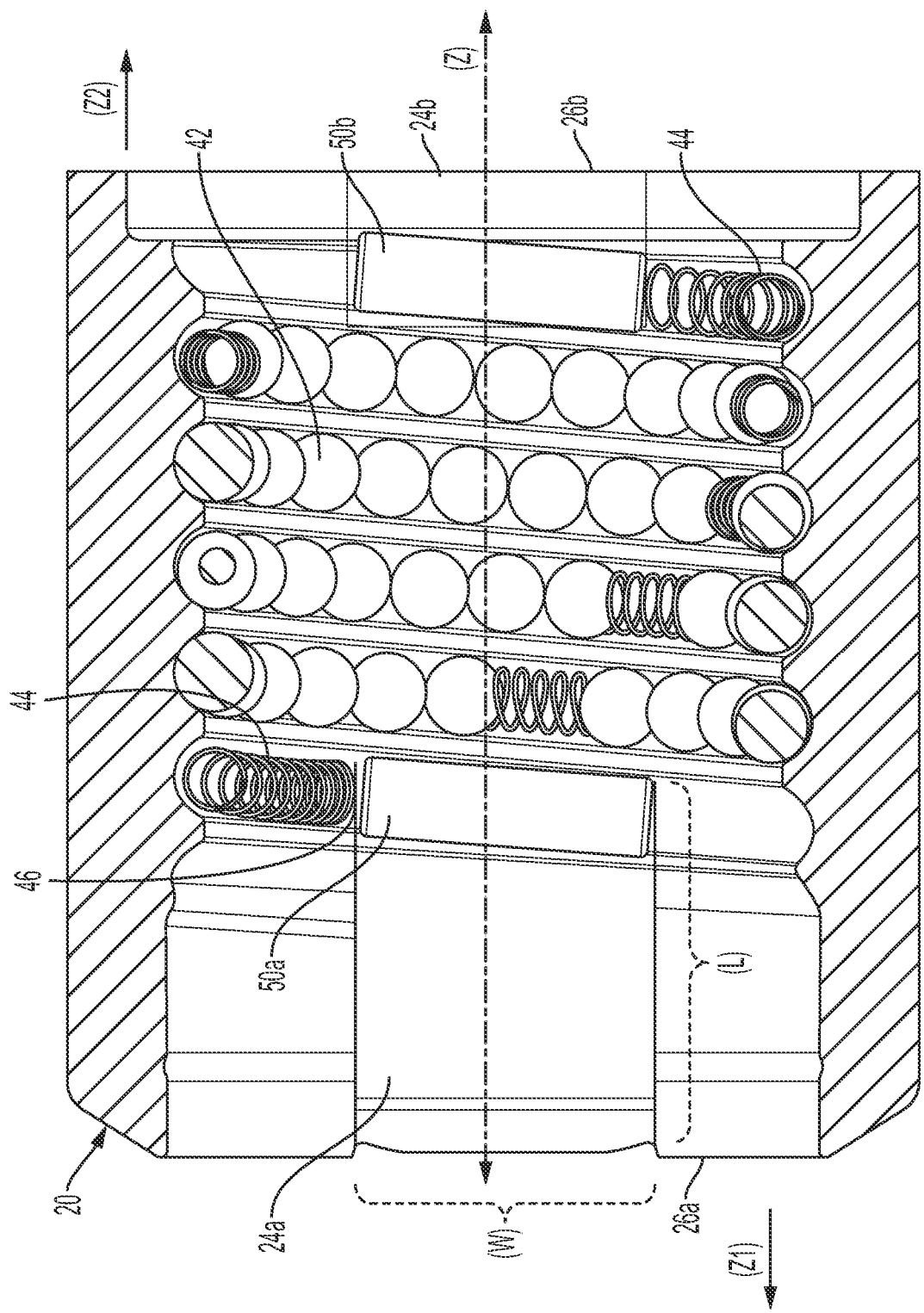
FIG. 1F is a side cross-sectional view of the ball screw assembly of FIGS. 1A-1E.
Figure 2:
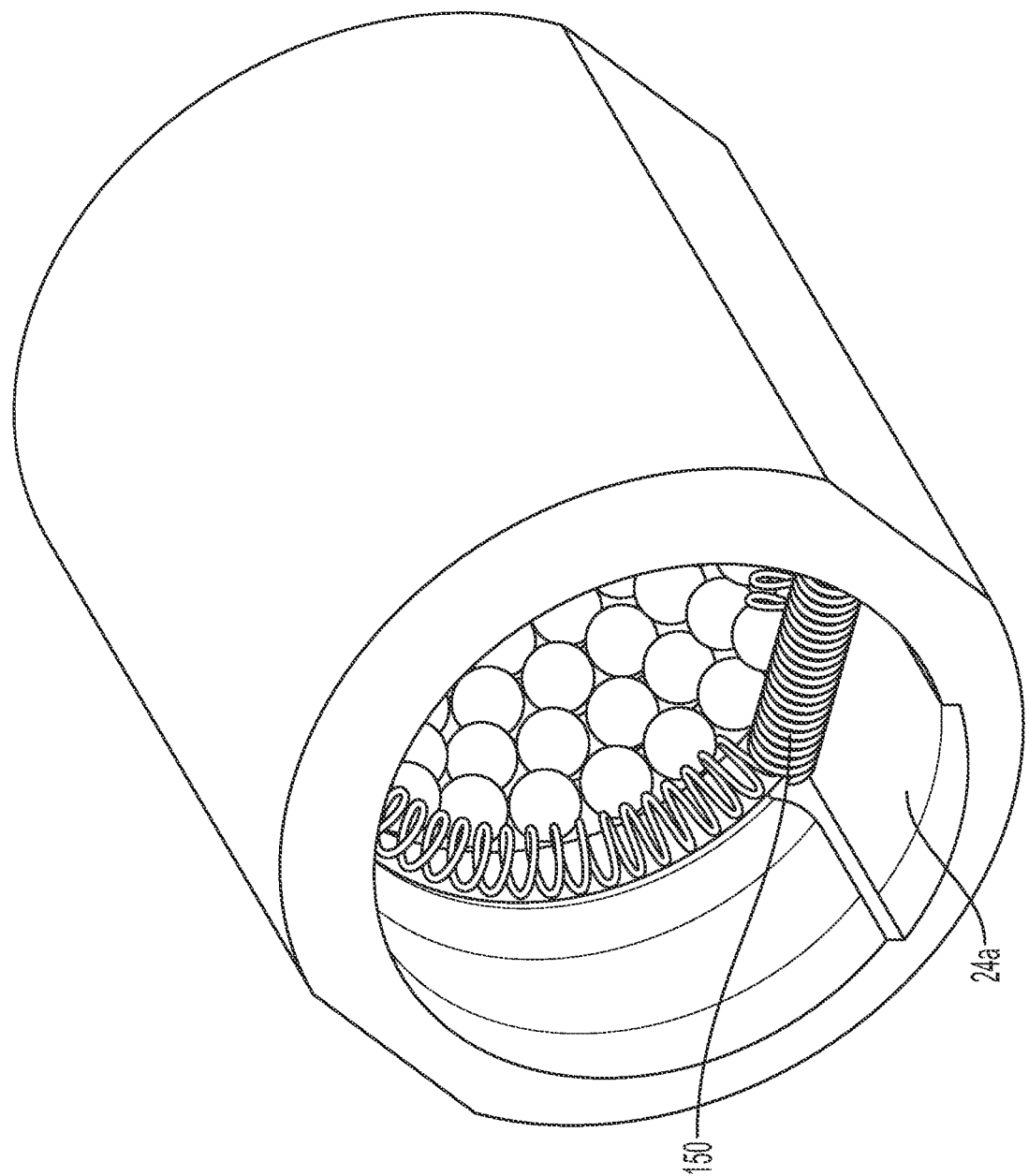
FIG. 2 is a perspective view of another embodiment of the ball screw assembly including a different end-stop component.

The notch 24 also has an axial length (L) shown in FIG. 1F. The axial length (L) of the notch 24 is greater than the width (W) of the notch 24 in one embodiment. In another embodiment, the length (L) of the notch 24 is equal to the width (W) of the notch 24, or less than the width (W) of the notch 24. The reset spring 44 is illustrated as being spaced away from the end-stop component 50a in FIG. 1F for illustrative purposes only.

In one embodiment, the notch 24 has a circumferential extent of at least 30 degrees. In one embodiment, the notch 24 has a circumferential extent of at least 45 degrees. In another embodiment, the circumferential extent could vary depending on design requirements. The circumferential extent of the notch 24 corresponds to the width (W) and pitch angle.

In one aspect, the notch 24 is positioned such that its width (W) is not symmetrical or centered with respect to the center axis plane (i.e. the plane perpendicular to the notch on axis (Z), as shown in FIG. 1F). As shown in FIG. 1F, notch 24 is off-centered to the axis (Z).

As best shown in FIG. 1C, a radially inner side 51 of the end-stop component 50 abuts the spindle 30. The radially inner side 51 of the end-stop component 50 contacts the spindle 30 in a medial region of the end-stop component 50.

Regarding the operation and function of the ball screw assembly 10, when a load is applied on the nut 20, the reset springs 44 bias the ball-spring assembly 40 in position while the spindle 30 rotates and the anti-rotation feature 28 on the nut 20 holds the nut 20 in a stationary axial position. When the load is applied to the nut 20, the ball-spring assembly 40 begins to roll or rotate along the raceways 22, 32, and the reset springs 44 are compressed. As the load is released, the reset springs 44 then bias the ball-spring assembly 40 back to their initial position. If the nut 20 rotates in a first axial direction (Z1), the ball-spring assembly 40 compresses as it engages a first end-stop component 50a. Similarly, as the nut 20 rotates in a second axial direction (Z2), the ball-spring assembly 40 compresses as it engages a second end-stop component 50b. One of ordinary skill in the art would understand that the function and operation of the ball screw assembly 10 can be modified depending on the specific requirements of a particular arrangement.

In other words, the arrangement disclosed herein provides a configuration in which the axial position of the end-stop component 50 is retained by a spindle thread or outer raceway 22 of the nut 20, and the radial position of the end-stop component 50 is retained by the notch 24.

A method of forming a nut 20 for a ball screw assembly 10 is also provided. The method includes forming a nut 20 having an outer raceway 22 on a radially inner surface of the nut and an anti-rotation feature 28 on a radially outer surface. The method also includes cold-forming at least one notch 24 on at least one axial end 26a, 26b of the nut 20. The at least one notch 24 is circumferentially adjacent to an end of the outer raceway 22. In other words, the raceway 22 is connected to the notch 24 in one embodiment.

Figure 3:
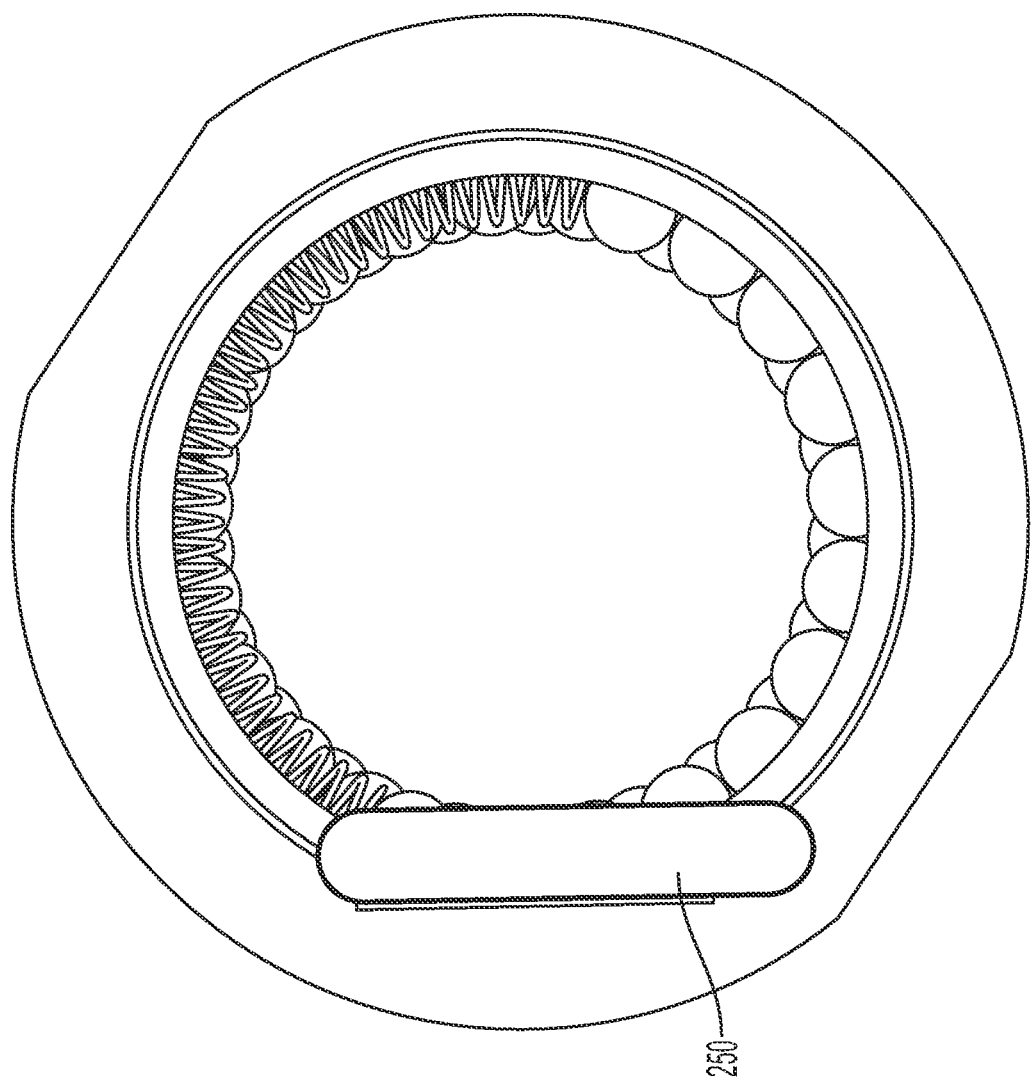
FIG. 3 illustrates an axial end view of a ball screw assembly having an end component with a modified profile.

FIG. 3 illustrates another embodiment in which the end component 250, i.e. the pin, includes rounded or spherical axial ends. In one aspect, this configuration can provide increased contact between the pin 250 and the notch and the ball-spring assembly.

Figure 4:
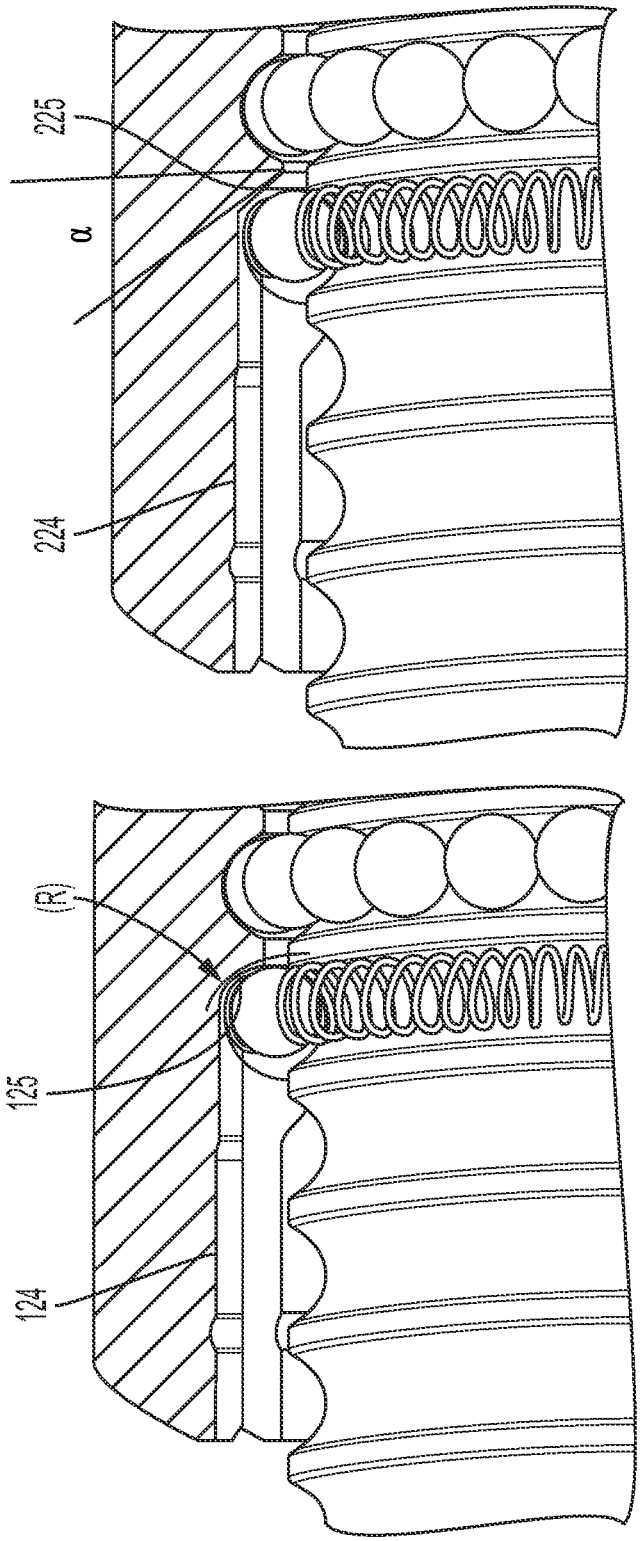
FIG. 4A illustrates a magnified view of a portion of a ball screw assembly having a notch with a modified profile.
FIG. 4B illustrates a magnified view of a portion of a ball screw assembly having a notch with another modified profile.

FIGS. 4A and 4B illustrate notches 124, 224 having modified profiles. In FIG. 4A, the notch 124 includes a rounded edge or side 125 having a radius (R) of curvature. In FIG. 4B, the notch 224 includes an angled edge or side 225 having an angled (α) surface.

Figure 5:
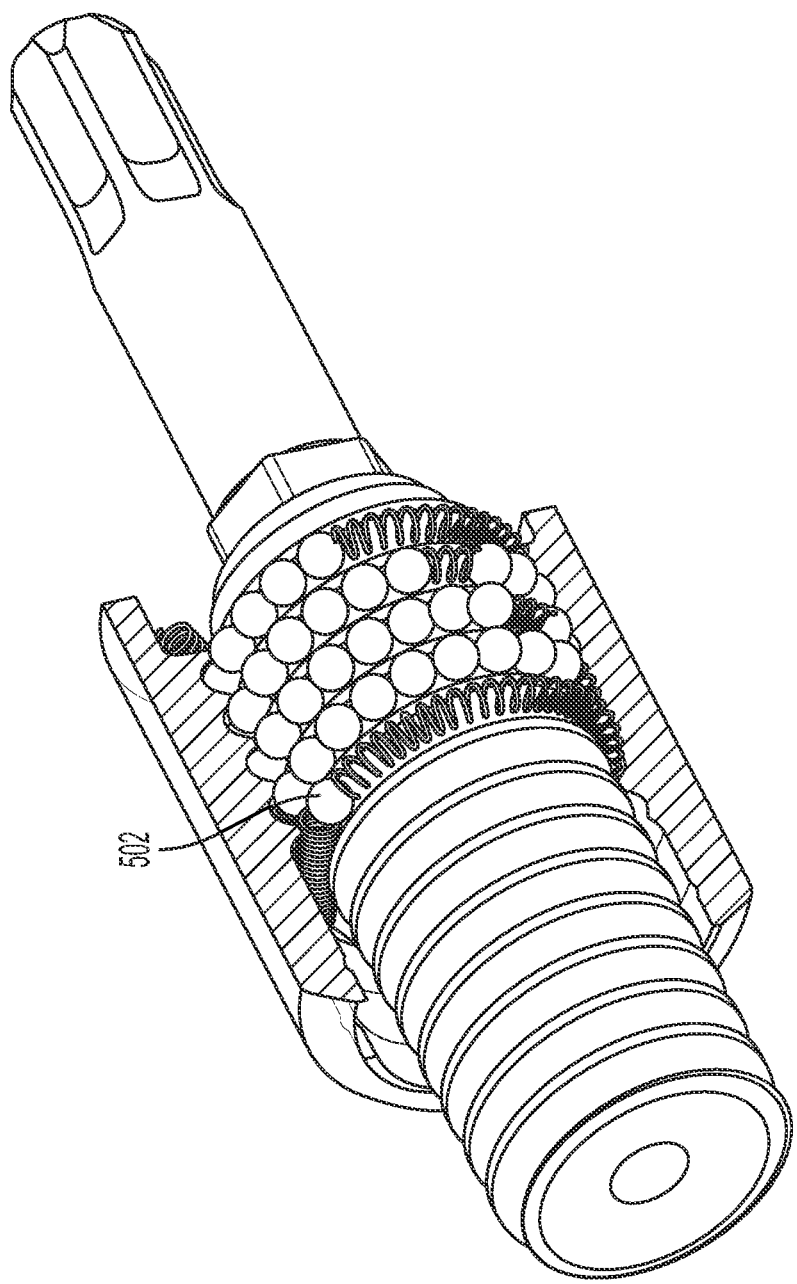
FIG. 5 illustrates another embodiment for a ball screw assembly.

In one aspect as shown in FIG. 5, an additional intermediate component 502 (i.e. another rolling element) can be positioned between the end component 250 and the ball-spring assembly.

Having thus described the present disclosure in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

Log of Reference Numerals
ball screw assembly 10
nut 20
outer raceway 22
notch 24
circumferential sides 25a, 25b
first axial end 26a of the nut
second axial end 26b of the nut
anti-rotation feature 28
spindle 30
inner raceway 32
ball-spring assembly 40
balls 42
reset spring 44
terminal end 46 of the ball-spring assembly
end-stop component 50
radially inner side 51 of the end-stop component
Z-Axis (Z)

What is claimed is:

1. A ball screw assembly comprising:
    a nut including an outer raceway, and at least one notch;
    a spindle extending inside of the nut, the spindle defining an inner raceway;
    a ball-spring assembly including a plurality of balls supported between the outer raceway and the inner raceway, and at least one reset spring engaged against at least one ball of the plurality of balls;
    at least one end-stop component engaged against a terminal end of the ball-spring assembly and positioned within the at least one notch, wherein the at least one notch has non-curved, flat circumferentially spaced apart sides each extending parallel to each other.

2. The ball screw assembly of claim 1, wherein the at least one notch has a quadrilateral profile.

3. The ball screw assembly of claim 1, wherein the at least one notch is formed by a cold-forming process.

4. The ball screw assembly of claim 1, wherein the flat circumferential sides have an identical depth (D).

5. The ball screw assembly of claim 1, wherein the at least one notch includes a first notch on a first axial end of the nut, and a second notch on a second axial end of the nut.

6. The ball screw assembly of claim 5, wherein the first notch and the second notch are not circumferentially aligned with each other.

7. The ball screw assembly of claim 5, wherein the first notch and the second notch have different axial lengths.

8. The ball screw assembly of claim 1, wherein the at least one notch has a width (W) that is greater than an axial extent (E) of the at least one end-stop component.

9. The ball screw assembly of claim 1, wherein the at least one end-stop component is a pin.

10. The ball screw assembly of claim 1, wherein the at least one end-stop component is a spring that is more tightly wound than the at least one reset spring.

11. The ball screw assembly of claim 1, wherein a radially inner side of the at least one end-stop component abuts the spindle.

12. The ball screw assembly of claim 1, wherein the at least one end-stop component has a greater stiffness than a stiffness of the at least one reset spring.

13. The ball screw assembly of claim 1, wherein the at least one notch has a circumferential extent of at least 30 degrees relative to a rotational axis (Z) of the ball screw assembly.

14. The ball screw assembly of claim 1, wherein an entirety of the at least one end-stop component is positioned within the at least one notch.

15. The ball screw assembly of claim 1, wherein the at least one notch includes a circumferential side having a rounded profile or angled profile.

* * * * *